United States Patent [19]

Princiotta

[11] 4,333,590

[45] Jun. 8, 1982

[54] GARMENT HANGER

[76] Inventor: Raymond A. Princiotta, 208 N. Concord, Havertown, Pa. 19083

[21] Appl. No.: 110,953

[22] Filed: Jan. 10, 1980

[51] Int. Cl.$^3$ .............................................. A47J 51/08

[52] U.S. Cl. ........................................ 223/85; 223/88; 40/322; D6/257

[58] Field of Search ........................ 223/85, 87, 88, 92, 223/95, 97, 98; 40/322; 211/113, 49 S; D6/247, 257; 248/339, 340; 206/281, 285, 291, 821

[56] References Cited

U.S. PATENT DOCUMENTS

| | | | |
|---|---|---|---|
| 566,510 | 8/1896 | Flegal | 223/88 |
| 1,591,786 | 7/1926 | Simpson | 223/88 |
| 2,989,191 | 6/1961 | Eason | 211/113 |
| 3,024,953 | 3/1962 | O'Keefe | 223/88 |
| 3,085,724 | 4/1963 | Wilde | 223/85 |
| 3,358,878 | 12/1967 | Ostborg et al. | 206/821 X |
| 3,482,746 | 12/1969 | Ferguson | 223/85 |
| 3,516,126 | 6/1970 | Berkovits | 223/88 X |
| 3,528,590 | 9/1970 | Nathanson | 223/85 |

FOREIGN PATENT DOCUMENTS

| | | | |
|---|---|---|---|
| 2147126 | 3/1973 | Fed. Rep. of Germany | 223/88 |

*Primary Examiner*—Robert Mackey
*Attorney, Agent, or Firm*—Seidel, Gonda, Goldhammer & Panitch

[57] ABSTRACT

A garment hanger is constructed so that its width adjacent to its hook is adjustable whereby coats or other garments on the hanger cannot be squashed together and the number of garments hanging on a rack can be ascertained without counting. The adjustability enables the same number of hangers to be on a rack regardless of the thickness of the material from which the garment is made. The adjustable member may be an integral part of a new hanger or may be a separate attachment to an existing hanger.

12 Claims, 10 Drawing Figures

FIG. 10
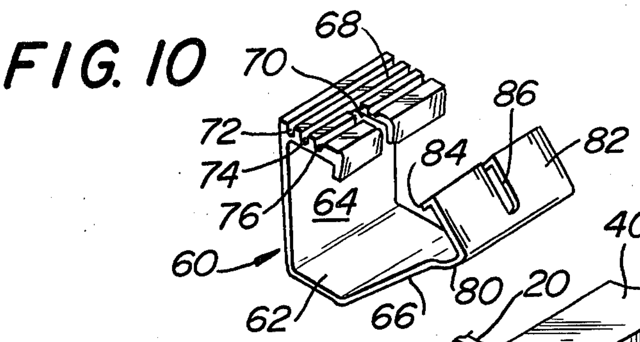
FIG. 6
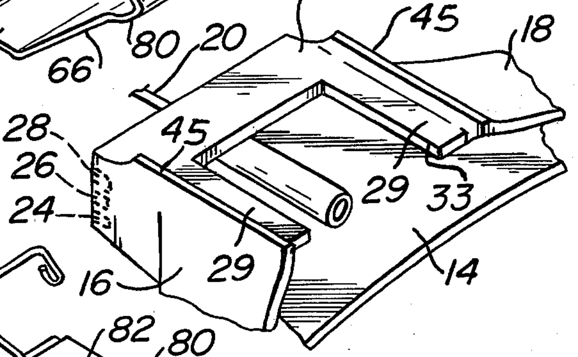
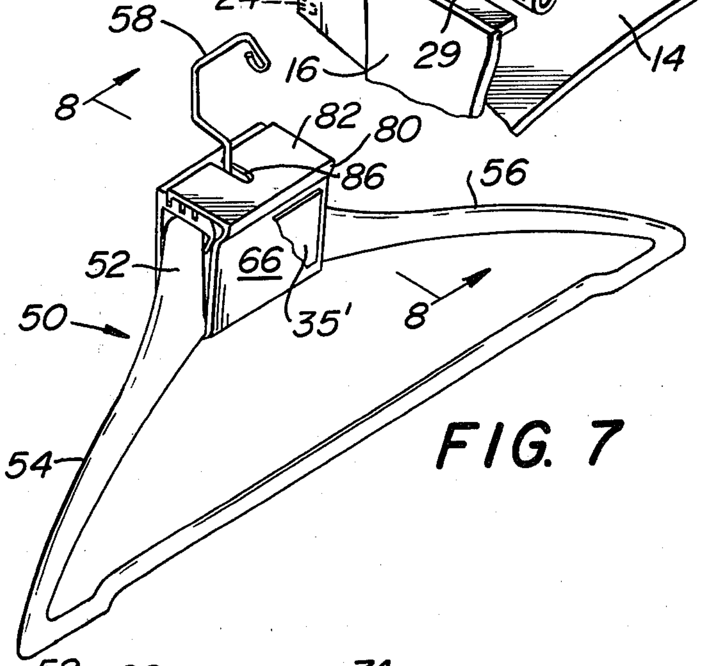
FIG. 7
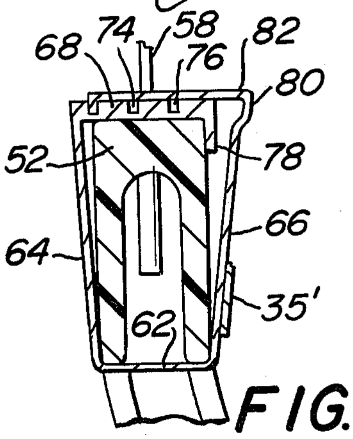
FIG. 8
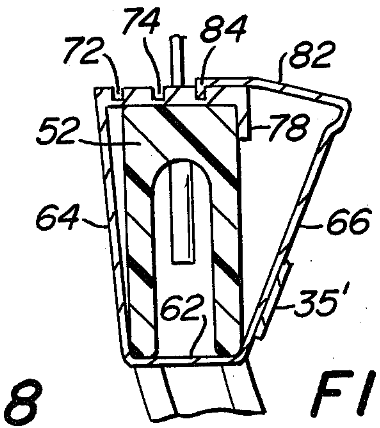
FIG. 9

GARMENT HANGER

BACKGROUND

There is a need for a garment hanger which is adjustable so that the same number of garments may be hung on a rack regardless of the thickness of the material from which the garments are made. Further, there is a need for an adjustable garment hanger which will prevent hangers from being squashed together whereby the number of garments on one rack can differ from the number of garments on a identical rack.

When a garment has just been manufactured and pressed, it is important that they not bump each other when placed on a rack. Also, new garments should not be squashed when shipped to a store room or display room if wrinkling is to be avoided.

The broad concept of a hanger constructed to prevent overcrowding is taught by U.S. Pat. No. 3,085,724. In that patent there is taught the concept of providing a spacer having only one operative position wherein it contacts the hook on the next adjacent hanger.

SUMMARY OF THE INVENTION

The present invention is directed to a garment hanger having a hook connected to a body. The body has arms and may have a cross bar extending across the arms. An adjustable spacer is provided on the body. The spacer is adjustable between at least two operative positions for adjusting the effective width of the body to thereby limit the extent to which two such hangers can approach one another on a rack.

It is an object of the present invention to provide a novel garment hanger having adjustable width so that an identical number of garments may be hung on an identical rack regardless of the weight or thickness of the material from which the garments are made.

It is another object of the present invention to provide a garment hanger which is adjustable and constructed in a manner so as to limit the extent to which two such hangers can approach one another on a rack.

The above objects are accomplished in a manner which is simple, inexpensive, and reliable.

Other objects will appear hereinafter.

For the purpoes of illustrating the invention, there is shown in the drawings a form which is presently preferred; it being understood, however, that this invention is not limited to the precise arrangements and instrumentalities shown.

FIG. 6 is a partial perspective view of the body without the spacer.

FIG. 7 is a perspective view of a hanger in accordance with another embodiment of the present invention.

FIG. 8 is a sectional view taken along the line 8—8 in FIG. 7.

FIG. 9 is a view similar to FIG. 8 with the spacer adjusted to another position.

FIG. 10 is a perspective view of the spacer of the second embodiment.

DETAILED DESCRIPTION

Figure 1:
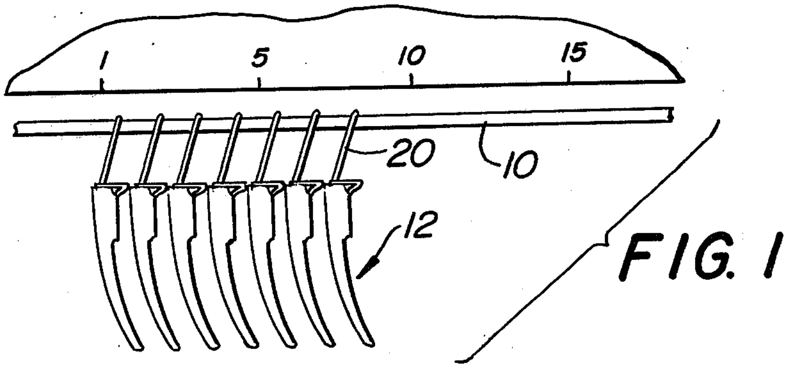
FIG. 1 is a side elevation view of a plurality of hangers on a rack.
Figure 5:
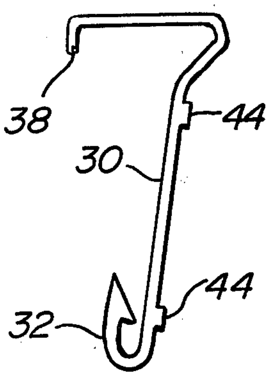
FIG. 5 is a side elevational view of the spacer.

Referring to the drawing in detail, wherein like numerals indicate like elements, there is shown in FIG. 1 a pipe rack 10 having graduations thereon or adjacent thereto. A plurality of hangers 12 are mounted on the pipe rack 10.

Figure 2:
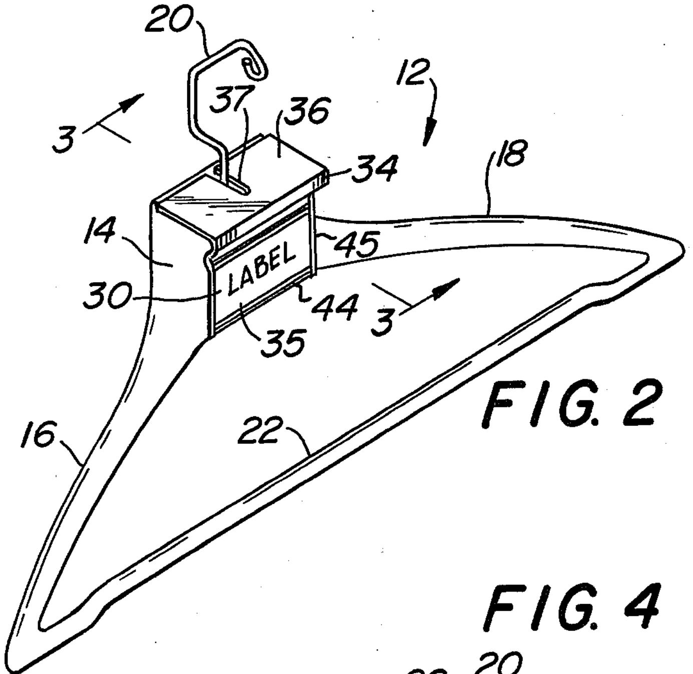
FIG. 2 is a perspective view of a hanger in accordance with the present invention.

Referring to FIG. 2, the hangers 12 include a body 14 connected to arms 16 and 18. The arms 16 and 18 may be interconnected by a cross bar 22. A hook 20 is secured to and extends upwardly from the body 14. The hanger 12 is preferably injection molded from a polymeric plastic material in one integral piece except for the hook 20 which is a preform metal insert into the mold. See FIGS. 2 and 6 wherein opposite side walls are of uniform thickness.

Figure 3:
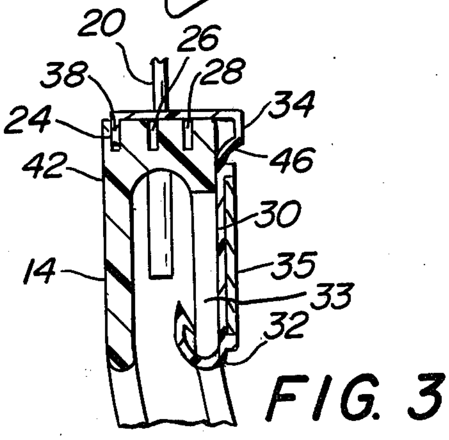
FIG. 3 is a sectional view taken along the line 3—3 in FIG. 2.
Figure 4:
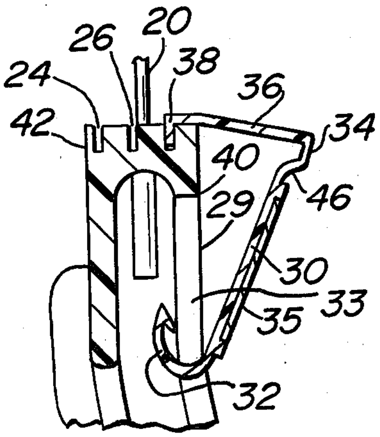
FIG. 4 is a view similar to FIG. 3 but with the spacer member adjusted to the maximum position whereby a minimum number of garments may be mounted on a single rack.

A spacer member 30 is adjustably attached to the body 14. Member 30 has a lip 32 which preferably terminates in a barb and is removably inserted into body 14 beneath side flanges 33. As shown in FIGS. 4 and 6, flanges 33 have land surfaces 29 which act as a limit stop for member 30 when the latter is in its minimum width position (FIG. 3). Member 30 has a curved portion 46 which merges with an abutment face 34 from which extends a flange 36. Flange 36 is slightly wider than the body 14 so that it can be easily grasped. Flange 36 has a tongue 38 adapted to be received in one of the slots 24, 26 and 28 on the upper surface of the body 14. In order that the flange 36 may transverse the shank of the hook 20, flange 36 is provided with a slot or notch 37. Member 30 is preferably made from the same material as body 14.

In its minimum width position, the spacer member 30 is generally parallel to a front face 40 and the land surfaces 29 on the flanges 33 with the abutment face 34 being generally parallel to the front face 40 and the body rear face 42. Spacer member 30 has a shape chosen so that it can be extruded, then cut to length, and then notched. The surfaces on body 14 which mate with member 30 are shown in FIGS. 3, 4 and 6. Spacer member 30 has a broad surface between ribs 44 on which a garment label 35 may be adhesively applied. Ribs 44 cooperate with ribs 45 on body 14 to simulate a frame for the label 35. Member 30 is sufficiently resilient so that it can flex when tongue 38 is moved from one slot to another.

In an operative embodiment of the hanger 12, 30 garments may be hung on every 36 inches of the pipe rack 10. When the tongue 38 is in the slot 26, the number of garments per yard is 25. With the elements as shown in FIG. 4, the number of garments per yard is 20. Thus, spacer member 30 has 2 or more operatively positions for changing the effective width of body 14. If all the spacer members are in the same position on all of the hangers 12 on the pipe rack 10, the exact number of garments on a pipe rack may be ascertained merely by visually confirming that the pipe rack 10 is full. Adjustment of the position of spacer member 30 also facilitates obtaining the same number of garments on a pipe rack even though one pipe rack may contain overcoats while another pipe rack contains suit jackets.

In FIGS. 7–10, there is illustrated a hanger in accordance with another embodiment of the present invention designated generally as 50. Hanger 50 is a conventional hanger having a body 52, arms 54, 56 and a hook 58. In order to obtain the advantages of the present invention, the conventional hanger 50 has been provided with an attachment spacer member 60 made from sheet metal or plastic and sufficiently large so that a garment label may be applied thereon as described above. The shape of member 60 was chosen so that it can be extruded, cut to length, and then notched.

The spacer member 60 includes a bight 62 from which extend legs 64 and 66. The leg 64 terminates in a flange 68 having a slot 70 for accomodating the shank of hook 58. The flange 68 has parallel slots 72, 74 and 76 on upstanding ridges along its side edges. The flange 68 terminates in a lip 78.

Referring to FIG. 10, the leg 66 has an abutment surface 80 connected to a horizontally disposed flange 82 terminating in a tongue 84. Tongue 84 is adapted to be received in any one of the slots 72, 74 and 76. Flange 82 has a slot 86 for receiving the shank of the hook 58. Member 60 is sufficiently resilient so that leg 66 may be flexed to position tongue 84 in any one of slots 72, 74, 76.

The hanger of the present invention may have the spacer member attached to the body as shown in FIG. 2 or may be an attachment as shown in FIG. 10. Thus, the present invention is adapted for use in connection with new hangers as well as hangers presently in use. In view of the above description with respect to hanger 12, a detailed repetition of the same in connection with hanger 50 is not deemed necessary. In each embodiment, all slots for receiving a tongue can be on one side of the hook shank whereby slots 37, 86 can be eliminated. The tongue receiving slots 24, 26, 28 are shown on body 14 but could be on the flange of the spacer member with a cooperating rib being provided on the body.

The present invention may be embodied in other specific forms without departing from the spirit of essential attributes thereof and, accordingly, reference should be made to the appended claims, rather than to the foregoing specification, as indicating the scope of the invention.

I claim:

1. A garment hanger having a hook connected to a body which has arms extending therefrom, the improvement comprising an adjustable spacer on the body, means on the upper end of the body adjacent the hook for selective mating cooperation with any one of at least two operative positions associated with one end portion of said spacer so that said spacer portion is adjustable between said operative positions for adjusting the effective width of said body to thereby limit the extent to which two such hangers can approach one another on a rack, said spacer portion being generally perpendicular to said arms, and an abutment surface on the other end portion of said spacer for contact with another hanger on a rack.

2. A hanger in accordance with claim 1 wherein said body and spacer are made from the same material, and a label attached to said spacer.

3. A hanger in accordance with claim 1 wherein said adjustable spacer is a separate attachment embracing said body.

4. A garment hanger in accordance with claim 1 wherein said means include at least two slots on a top portion of said body for selectively receiving a tongue on a flange constituting said adjustable spacer portion.

5. A garment hanger in accordance with claim 1 wherein said spacer abutment surface extends across its entire width for contacting a rear face on the body of another hanger adjacent thereto on a rack.

6. A hanger in accordance with claim 1 wherein said means includes three parallel slots in the body top surface, said adjustable spacer portion having a tongue selectively receivable in each one of said slots.

7. A hanger in accordance with claim 1 wherein said spacer overlies an opening in a side face of said body.

8. A hanger in accordance with claim 7 wherein said spacer has a lip received in said body adjacent the lower end of said opening.

9. A garment hanger having a metal hook connected to a plastic body which has arms extending therefrom, the improvement comprisng a plastic spacer adjustably supported by the body and cooperating therewith to define the width of the body, said spacer being adjustable relative to the body between at least two operative positions for adjusting the effective width of the body to thereby limit the extent to which two such hangers can approach one another on a rack, said spacer having a generally horizontal member, a tongue on one end portion of said member, said member having an abutment surface on the opposite end portion for contact with another hanger on a rack, said hook having a shank portion, and means defining at least one slot on opposite sides of said hook shank portion and generally perpendicular to said shank portion for selective receiving said tongue when said spacer is in one of said operative positions.

10. A hanger in accordance with claim 9 including a garment label secured to an exposed face of said spacer.

11. A hanger in accordance with claim 9 wherein said horizontal member has a slot through which said hook shank portion extends in one position of said horizontal member.

12. A hanger in accordance with claim 9 wherein said body has an opening on one side which is covered by said spacer.

* * * * *